No. 699,509. Patented May 6, 1902.
J. FINNEGAN.
COUPLING FOR RAILINGS, &c.
(Application filed Jan. 30, 1902.)
(No Model.)
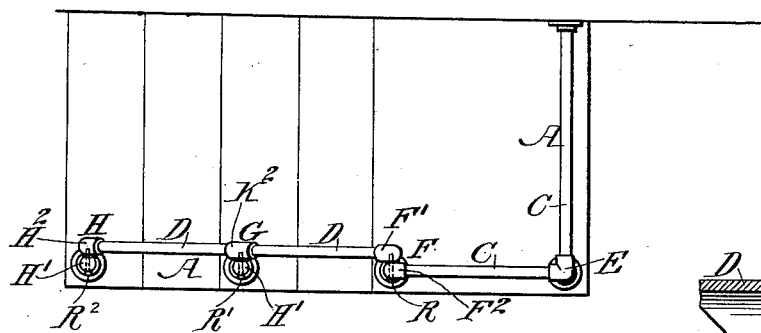
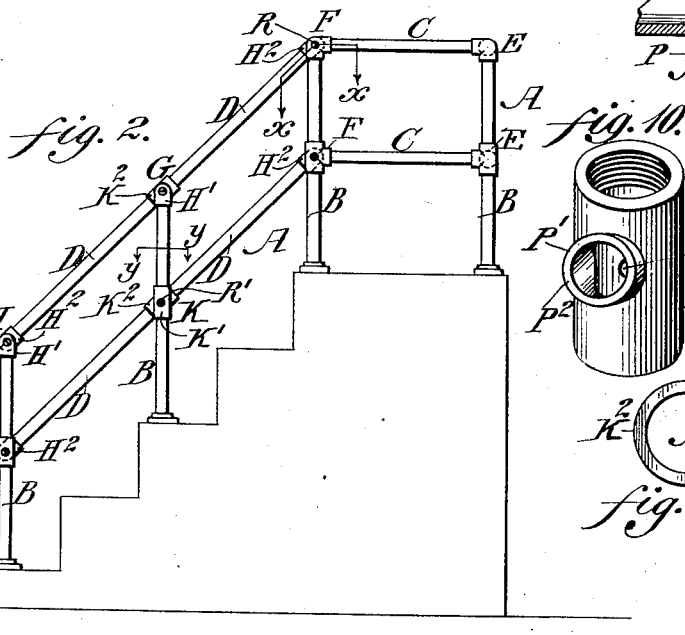
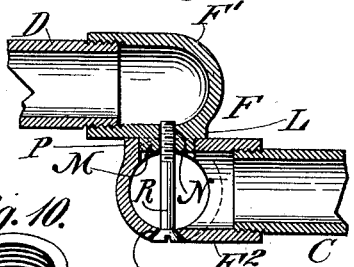
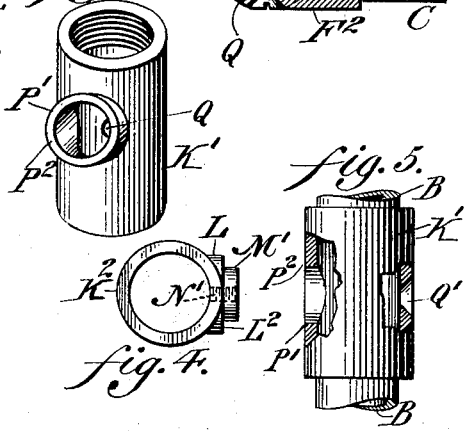
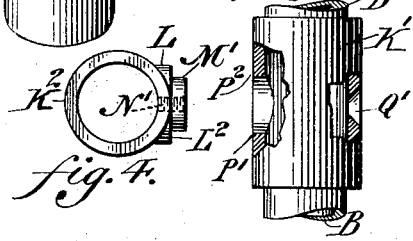
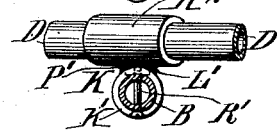
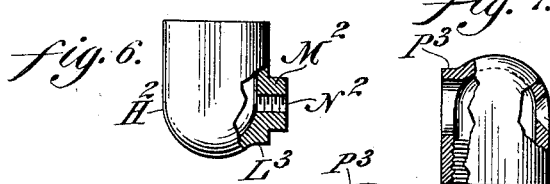
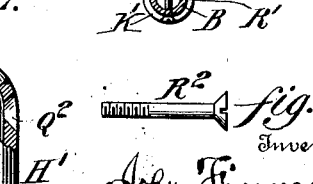
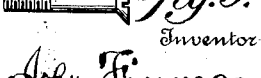
Witnesses
Inventor
John Finnegan.
Attorneys

UNITED STATES PATENT OFFICE.

JOHN FINNEGAN, OF PHILADELPHIA, PENNSYLVANIA, ASSIGNOR TO THOMAS DEVLIN & CO., OF PHILADELPHIA, PENNSYLVANIA, A FIRM.

COUPLING FOR RAILINGS, &c.

SPECIFICATION forming part of Letters Patent No. 699,509, dated May 6, 1902.

Application filed January 30, 1902. Serial No. 91,820. (No model.)

*To all whom it may concern:*

Be it known that I, JOHN FINNEGAN, a citizen of the United States, residing in the city and county of Philadelphia, State of Pennsylvania, have invented a new and useful Improvement in Couplings for Railings, &c., of which the following is a specification.

My invention consists of a coupling for the side and upright members of a railing, &c., the parts of said coupling being adapted to be set relatively to the angle that the side members of the railing may assume.

Figure 1 represents a top and plan view of the coupling embodying my invention. Fig. 2 represents a side elevation thereof. Fig. 3 represents a section on line $x\ x$, Fig. 2, on an enlarged scale. Fig. 4 represents a top view of a detached portion. Fig. 5 represents a side elevation of a detached portion. Figs. 6 and 7 represent side elevations of detached portions. Fig. 8 represents a partial plan view and partial horizontal section on line $y\ y$, Fig. 2. Fig. 9 represents a side elevation of a screw that is employed for connecting the parts of a coupling. Fig. 10 represents a perspective view of the portion shown in Fig. 5. Fig. 11 represents a perspective view of the portion shown in Fig. 7.

Similar letters of reference indicate corresponding parts in the figures.

Referring to the drawings, A designates a railing for steps or stairs, the same consisting of the upright members B, the horizontal members C, the oblique members D, the couplings E for the members B C, the couplings F for the members C D, and the couplings G, H, J, and K for the members A D. One section F' of each of the couplings F has on the side thereof the socket L and the reduced neck M, which projects from said socket, and an opening N in said neck and socket. The opposite section F² has a socket P, which freely surrounds the neck M, and the outer faces of the sockets L and P are flat and contact, so as to ride one on the other during the adjustment of the sections of the coupling and provide broad surfaces which prevent said sections from tilting on each other. In the outer side of the section that carries the socket P there is an opening Q, which is opposite to the opening N in said socket L, the same receiving the screw R, which is passed through the opening Q and engaged in the opening N, thus uniting the sections, it being evident that when the screw R is loosened the sections may be turned on each other in order to adjust the members of the same relatively to the oblique members D of the railing and the other section relatively to the upright members of the same, after which said screw is tightened and the sections of the coupling retain their adjusted position.

In Figs. 4 and 5 one section K has the vertical members B through the same and is provided on one side with an opening Q' and on the opposite side with the socket P', the latter receiving the neck M' of the opposite sections K², the faces P² of the socket P' and face L² of the socket L' being in contact and adapted to be turned one on the other.

One section K² of the coupling K is designed to be placed in an oblique position, and the member D of the railing is passed therethrough, and the section K' is in vertical position, the sections being coupled by the screw R', entering the openings Q' N', as shown in Fig. 8 on a reduced scale from the parts shown in Figs. 4 and 5, they being coupled in Fig. 8 and separated in Figs. 4 and 5.

Figs. 6 and 7 show the sections of the coupling H, the section H' having an opening Q² therein and the socket P³, the opposite member H² having a socket L³ and neck M² and an opening N² in said neck and socket, said socket P³ receiving the neck M² and having its flat face abutting freely against the flat face of the socket L³, by which provision when the screw R² is passed through the respective openings said sections H' and H² are coupled, one section being in an oblique and the other section in a vertical position, as shown at the left side of Fig. 2.

Fig. 10 is a perspective view of the section K' of the coupling K, showing more plainly the socket P' thereon.

Fig. 11 is a perspective view of the section H', the same showing the socket P³ more fully than in Fig. 7.

It is evident that by these means the sections of the coupling may be turned so as to change their angular direction relatively to the angles that may be assumed by the members D of the railing, it being also evident that said members are variable in their angularity, owing to the size of steps, stairs, &c., to which the railing may be applied. Furthermore, the heads of the screws R R' R² are the only portions of said screws that are visible or exposed, and owing to the encircling nature of the several sockets the necks and the inner openings N N' N² are inclosed, and thus the threaded ends of the screws are covered and guarded from being subjected to rain, snow, &c., the effect of which is evident.

Having thus described my invention, what I claim as new, and desire to secure by Letters Patent, is—

1. A coupling for the members of a railing consisting of sections, one of which is formed with a neck, and the other section provided with a socket, the latter being adapted to freely receive said neck, and a screw which is passed through the side of one section, through said socket and into the neck of the other section.

2. A coupling for a railing consisting of sections, one of which has a neck with a socket on one side, an opening therethrough, a contiguous section having a socket and an opening opposite to the latter, and a screw passing through said opening and socket into the opening of the neck and socket of the other section.

3. A coupling consisting of sections, one of which has a neck thereon, and a socket on one side thereof, and another section having a socket and opening in opposite sides and a screw passing through said opening and socket into the neck and socket of the other section, said sockets having flat faces which are in contact and adapted to ride one on the other in the adjustment of the coupling and rest firmly on each other in the fixed connected condition of the latter.

JOHN FINNEGAN.

Witnesses:
JOHN A. WIEDERSHEIM,
WM. CANER WIEDERSHEIM.